Figure 1:
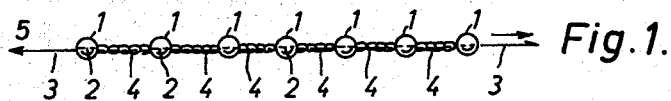

June 22, 1965  PIA-MARIA KLEIN  3,190,086
EXPANDABLE BRAIDED ORNAMENT
Filed Oct. 20, 1961

INVENTOR:
PIA MARIA KLEIN
By Toulmin & Toulmin
Attorneys

Patented June 22, 1965

3,190,086
EXPANDABLE BRAIDED ORNAMENT
Pia-Maria Klein, Eulerstrasse 41a,
Stuttgart-Rohr, Germany
Filed Oct. 20, 1961, Ser. No. 146,543
Claims priority, application Germany, Nov. 29, 1960,
K 42,265
1 Claim. (Cl. 66—193)

The invention relates to a process for making ornamented braiding and to convertible decorative articles made by this process.

The invention aims to make a completely novel type of decorative article which is extremely durable and can be adapted to many purposes, by stringing pierced decorative members, for example, beads used in necklaces and brooches and for decorating dresses, belts and shoes, the hair, lamps, etc. on to synthetic fibres with a polyamide base.

It is known to string pierced decorative members on smooth synthetic fibres and fasten them at intervals. The disadvantage of this arrangement is that it is not expansible and the same article cannot be worn, for example, as a bracelet, a necklace or a belt.

Other known decorative articles, using expansible fibres with a rubber base, have the disadvantage that these fibres become stretched and become permanently deformed or lose their elasticity and are not resistant to exposure. Nor can such articles be washed, and exposure to strong sunlight makes the rubber brittle.

The object of the present invention is to avoid these disadvantages and, by a simple method, to make articles which, being arranged on corrosion-resisting, durable fibres, are so expansible that they can be worn both as a bracelet and as a necklace or belt, without losing their decorative appearance.

The object of the invention is achieved by stringing the decorative member on a smooth synthetic fibre at intervals which are too large, and obtaining the correct, desired spacing solely by twisting the portions of fibre located between the members. The spacing can be re-adjusted by stretching.

Synthetic fibres, preferably with a polyamide base, are used for this arrangement. These fibres may be of the same color or multicolor, or transparent and colored fibres may be used. The color itself serves only to change the decorative effect. The essential feature is that the known property of synthetic fibres of becoming more elastic when twisted is used. This results in the advantage that the article is not only decorative in appearance but can be varied in dimension. If the beads are used, e.g. with a very small spacing as a bracelet, and subsequently as a belt, i.e. with a very wide spacing, a totally different impression is created. Another important feature is that decorative articles are obtained which resist water and corrosion and in addition, as already mentioned, can have many uses.

A preferred arrangement with the new process consists in effecting the elastic twisting to decrease the spacing between the decorative members by the known process of crocheting open stitches, the decorative members being crocheted on in turn, separately or in groups.

The synthetic fibre is, that is to say, crocheted into an open-stitch chain. The crocheting can be done by hand or mechanically. In this method, a certain length is crocheted, a bead, jewel, or other ornament is incorporated in the chain and crocheting is continued thereafter. The crocheting enables a considerable length of fibre to be accommodated in a short space. When the chain is stretched the width of the stitches narrows, whereas when the stretching stops it widens again. The elasticity obtained in this way cannot be destroyed by age or exposure, as is the case with rubber fibres. If several rows are crocheted, or a large range of expansion is allowed for, the decorative members arranged, for example, at comparatively small intervals, will be gathered up, so that, from the point of view of appearance, quite different effects are produced, i.e. the whole series of possibilities, ranging from gathering up to alignment of the decorative members at wide intervals, are combined in decorative article, according to how much it is stretched when worn.

This construction makes use of the crimping process used in making or preparing knitwear, again to vary the elasticity. Both processes can, of course, be used if a crimped fibre is employed to make open stitches.

A special form of the new process consists in using several smooth fibres of matching colors to secure the decorative members.

In this case the smooth fibres are crocheted in adjacent open stitches. If the threads are of different colors the effect is particularly attractive. Decorative articles made in this way can be subjected to particularly strong stretching such as arises when they are used as belts or in some cases as shoe straps.

Among many other variations it is also possible to surround the elastic fibre portions between the decorative members with decorative sleeves.

With this type of article the sleeves serve to cover the elastic portions in their contracted condition and are decorative. When the ornament is expanded, the elastic portions will be drawn out from the enclosing sleeves at both ends thereof. It is particularly effective if the article, consisting as it does to a certain extent of rigid members, is capable of very great expansion, since the lengthening takes place inside the sleeves but the sleeves themselves do take part in any such deformation.

Examples of the invention are illustrated in the drawing. At the same time further features are included in the drawing and related description.

Figure 2:
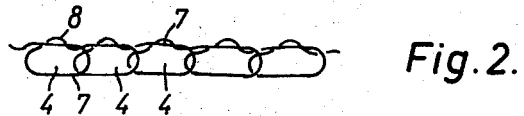
Figure 3:
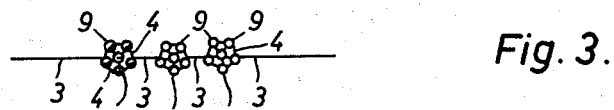
Figure 4:
Figure 5:
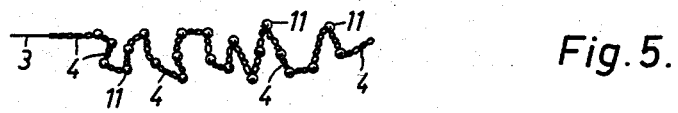
Figure 6:
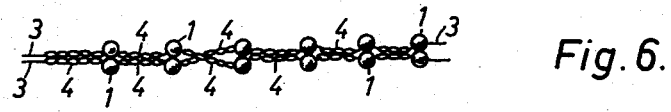
Figure 7:
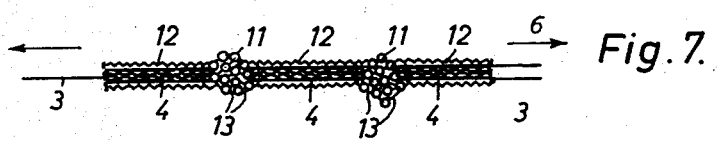

In the drawings:
FIG. 1 is a diagram of a decorative article made by the new process, slightly stretched;
FIG. 2 illustrates the known crocheting process with open stitches;
FIG. 3 is an arrangement where elastic fibre-lengths are inserted between smooth fibre-lengths;
FIG. 4 is a diagram of crocheted stitches with decorative members made up into groups;
FIG. 5 is a chain designed for a large expansion;
FIG. 6 shows elastic fibre-lengths arranged parallel and transversely to each other;
FIG. 7 illustrates the use of sleeves over the elastic parts.

The decorative members 1, e.g. beads, have holes 2 and are strung on a smooth synthetic fibre 3. The open stitches 4, made by crocheting, are arranged between the members 1. When stretched in the direction of the arrows 5, 6, the round crochet stitches are deformed, possibly so much that their longitudinal sides are brought together. The superjacent and subjacent loops 8 enable the longitudinal sides 7 to revert to their wide spacing when the stretching stops, and thus reduce the total length. Synthetic fibres with a polyamide base are inherently resilient and slightly elastic, and loops made by crocheting have such a large radius of curvature, that it is impossible for the synthetic thread to be deformed.

Lengths of straight synthetic fibre 3 can also alternate with gathered up portions 9, these latter being formed by members 1 interspaced with crocheted open stitches 4.

The decorative members 10 can also be joined together with smooth fibres. These grouped members 10 are then interspersed with open stitches 4, of which there may be one, two or more rows.

In FIG. 5 the synthetic fibres 3 are joined to the open stitches 4 to which the comparatively small decorative members 11 are attached. Here the open stitches are so small, i.e. the elasticity so great, that the whole structure undergoes a strong, irregular contraction. An arrangement of this type is particularly suitable for use as a bracelet, necklace and belt.

Instead of the crocheted open stitches, however, a knitting or stitching process can equally well be used, provided that it succeeds in accommodating a considerable length of fibre in a small spacing between the individual members 1, 10, 11. The fibre selected must be strong enough to allow of sufficiently large radii of curvature to ensure elasticity.

Still further possibilities reside in the parallel arrangement of open stitches 4, as shown in FIG. 6. These parallel open-stitch chains can be crossed at specific points or indiscriminately. A belt or decorative article made in this way is particularly hard-wearing. It is more particularly capable of great stretching, so that decorative members can now be used on articles which it was never before possible to ornament because the stretching strain was too great, e.g. belts, shoe straps in fashionable ladies' footwear, diadems, etc.

In the arrangement shown in FIG. 7 the open stitches 4 inside the sleeves 12 are, for instance, of a different character from the open stitches 13 which gather up the small members 11. This article can also be considerably expanded by stretching in the direction of the arrows 5, 6. It is particularly decorative when the elastic open stitches 4, normally concealed within the sleeves 12, become visible adjacent to the latter. The stitches can be made larger or smaller according to the crochet hook used, and their elasticity varies accordingly.

The scope of application of the invention includes all circumstances where decorative members are required to be attached for decorative purposes, using elastic fibres such as linear polyamide synthetic fibres, thus to obtain particularly durable, versatile and convertible articles.

I claim:

A necklace, bracelet, belt and the like, comprising a single, smooth, resilient, synthetic linear polyamide thread, crocheted into an open stitched chain-like series of small extensible link-like loops, spacedly threaded bead-like members positioned between said loops and a plurality of said loops separating said adjacent bead-like members, resulting in a closed ornamental chain which may be extended for application to a body member.

References Cited by the Examiner

UNITED STATES PATENTS

| 414,236 | 11/89 | Merrow | 2—278 |
| 2,244,208 | 6/41 | Miles. | |
| 2,251,508 | 8/41 | Watson. | |
| 2,554,629 | 5/51 | Meyer | 63—3 |
| 3,063,058 | 11/62 | Vollet | 63—5 XR |

FOREIGN PATENTS

| 1,202,418 | 7/59 | France. |

EARL M. BERGERT, *Primary Examiner.*

JACOB STEINBERG, *Examiner.*